United States Patent [19]

Haugeneder et al.

[11] 4,372,373
[45] Feb. 8, 1983

[54] CASING FOR BUILDING WORKS

[76] Inventors: Hans Haugeneder, Unterer Markt 8, A-3335 Weyer; Erich Panzhauser, Gentzgasse 129, A -1180 Vienna, both of Austria

[21] Appl. No.: 121,577

[22] Filed: Feb. 14, 1980

[30] Foreign Application Priority Data

Feb. 15, 1979 [AT] Austria ................................. 1192/79

[51] Int. Cl.³ .............................................. F24H 3/02
[52] U.S. Cl. ........................................ 165/54; 165/10; 98/31; 126/400; 126/431
[58] Field of Search ........................ 165/49, 53, 55, 10, 165/54, 48 S; 98/31; 126/428, 429, 430, 431, 436, 400

[56] References Cited

U.S. PATENT DOCUMENTS

| 2,595,905 | 5/1952 | Telkes | 126/428 |
| 4,068,652 | 1/1978 | Worthington | 165/48 S |
| 4,069,809 | 1/1978 | Strand | 126/431 |
| 4,111,359 | 9/1978 | Trombe et al. | 126/430 |
| 4,143,815 | 3/1979 | Meysenburg | 62/238 |
| 4,147,300 | 4/1979 | Milburn | 126/429 |
| 4,212,292 | 7/1980 | Reinert | 126/429 |
| 4,257,396 | 3/1981 | Reinert | 126/429 |
| 4,290,416 | 9/1981 | Maloney | 126/430 |
| 4,296,798 | 10/1981 | Schramm | 126/431 |

Primary Examiner—Albert W. Davis, Jr.
Assistant Examiner—Margaret A. Focarino
Attorney, Agent, or Firm—Cushman, Darby & Cushman

[57] ABSTRACT

A casing for a building having an absorbing and heat exchange layer, which on operation for heating the building, has the function of stopping the loss of heat from the inside to the outside and, on cooling operation, of stopping the transfer of heat from the outside to the inside. A glass-clear or opaque outer casing may be placed spaced from the absorbing and heat exchange layer.

33 Claims, 15 Drawing Figures

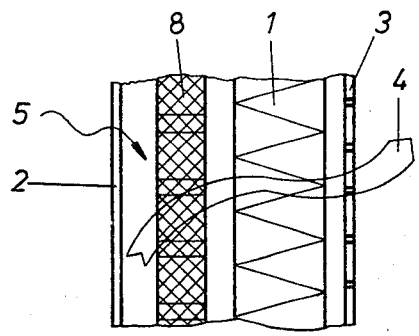
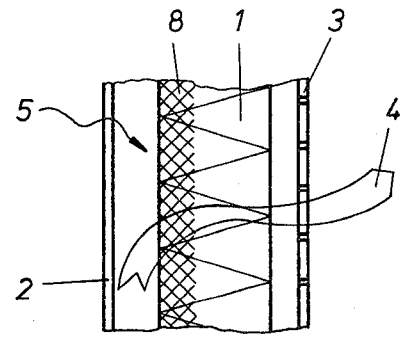
Fig. 8a  Fig. 8b
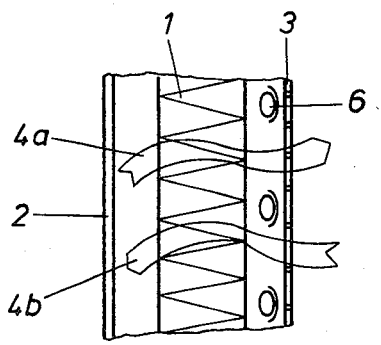
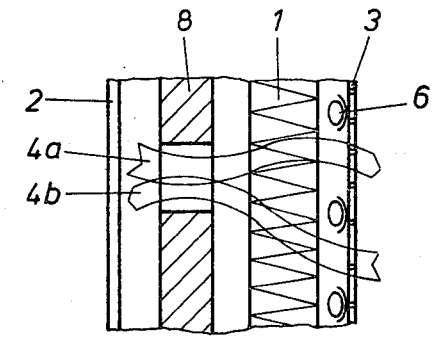
Fig. 9a  Fig. 9b

CASING FOR BUILDING WORKS

BACKGROUND AND SUMMARY OF THE INVENTION

The present invention relates to a casing for buildings.

One purpose of the present invention is to provide a casing for buildings that, generally, or mostly, permits the transmission of heat through the outer casing only in one desired direction.

For effecting these and other purposes the building casing of the invention is designed with an air-permeable absorbing and heat exchange layer.

Preferably, the building casing is provided with a glass-clear (translucent) or opaque portion which is spaced from the absorbing and heat exchange layer. In addition to, or in place of, the glass-clear or opaque outer casing part, it is possible to have an air-permeable inner lining, which is spaced from the absorbing and heat exchange layer.

The invention further relates to a method of producing a desired climate in the inner space of a building having the building casing placed round it, in which, as part of the present invention, air is guided through the absorbing and heat exchange layer and the speed of the air current through this layer is so controlled that the heat, which is taken up from the absorbing and heat exchange layer by transmission and conduction of heat, is given up to the air moving through the structure. More specifically, the new or unused air may be drawn through the building casing into the building's inner space or unused air may be drawn through the heat exchanger thereby cooling the air. Depending on the time of year, the drawing in of unused air may be stopped and, in place of this, waste or used air is forced out through the building casing.

One apparatus for undertaking the process of producing the desired climate or conditions in the inner space of a building with a casing around it, has a unit, by way of which the air pressure in the inner space of the building may be continuously, or intermittently maintained above or below the atmospheric pressure outside the casing of the building. A floor heat exchanger may also be used.

In the present invention, heat transfer may be effected through the casing of the building in only one desired direction, so that for heating or cooling of rooms no power is needed.

An account will now be given of preferred working examples of the building casing in line with the present invention, of a preferred process of producing a desired climate in an inner space of a building, and of an apparatus for undertaking the process.

SUMMARY OF THE DRAWINGS

These and other details of the measures and properties of the invention will be clear from the following detailed description when taken together with the drawings in which:

FIGS. 8a and 8b are views of two further examples of a building casing with radiant heating;

FIGS. 9a and 9b are views for making clear the placing of the heat storing layers of the present invention.

DETAILED DESCRIPTION OF THE PREFERRED EMBODIMENTS

Figure 1:
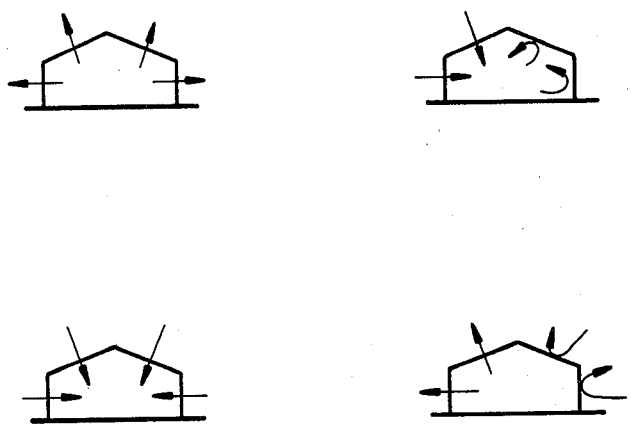
FIG. 1 is a schematic for making clear the way in which prior art building casings are different from the building casing of the present invention.

FIG. 1 makes clear the way in which a prior art building casing and that of the present invention are different, this being with respect to winter and summer as different times of the year. In the case of the prior art building casing, in winter there is transmission or transfer of heat from the inside to the outside, that is to say there is a loss of heat while in the present invention, there is heat transfer from the outside to the inside or there is no transfer. Thus, in winter, the amount of heat in the building is increased, or, at least, losses of heat are stopped. In summer, in the prior art building casing, there is a transfer of heat from the outside to the inside, that is to say there is a chance of overheating, while in the building casing of the present invention, there is heat transfer from the inside to the outside or no transfer. Thus, in summer, a cooling effect is produced, or, at least, the danger of overheating eliminated. For present purposes, the average winter outside temperature is taken as 0° C. with an inside temperature of 20° C., while in summer the average outside temperature is taken as 27° C. with an inner temperature of 22° C.

As will now be made clear, the building casing of the present invention may furthermore be taken to be an integrated collector system. It may be seen from FIG. 2 that the overall heat power need goes down to that level necessary for heating up the unused or fresh air.

Figure 2:
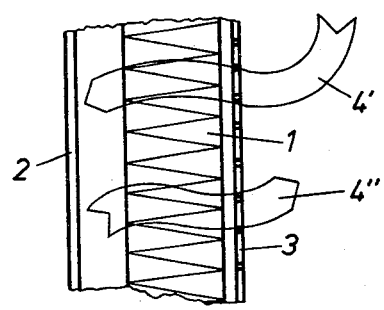
FIG. 2 is a view of a preferred example of the building casing forming part of the present invention.
Figure 10:
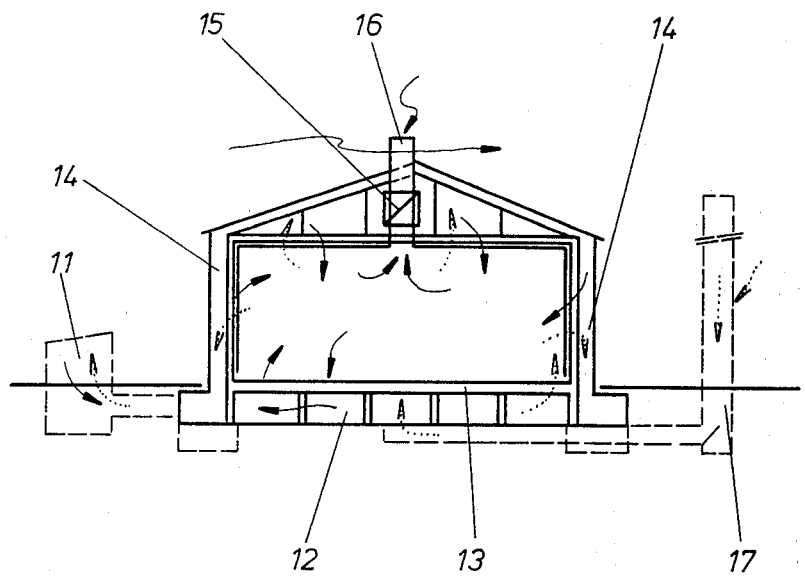
FIG. 10 is a schematic view of a building with the casing and supplemental apparatus of the present invention.

The structure of a building casing of the present invention may be used for an integrated wide-area heat transfer system (see FIG. 10). As shown in FIG. 2, the building casing takes the form of a collector for the heat of the ambient air around the building. The casing is made up of an air-permeable heat absorbing and heat exchange layer (herein only named the absorber layer 1) and a glass-clear (translucent) or opaque outer casing 2. It is preferable, furthermore, to have an air-permeable inner lining 3. The outer casing 2 is spaced from the outside of the absorbing layer 1 and, furthermore, the air-permeable inner lining 3 is spaced from the absorbing layer 1.

FIG. 2 makes clear, generally, the direction of motion of the heat carrying medium, for example air, in the case of heating and in the case of cooling. The direction of flow of air in either case may be controlled by a transfer system as described below with reference to FIG. 10. The building casing in the form of the collector for the heat of the air around the building is so designed that heat is able to go through the absorbing layer 1 in two directions, the direction of heat transfer in each case through the absorbing layer being controlled by the flow direction in the opened collector circuit which is described in detail below with reference to FIG. 10.

In FIG. 2, it will be seen that the outer casing 2 is turned towards the outside, while the air-permeable inner lining 3 and the absorbing layer 1 are turned toward the inner side. In the case of cooling, the air will go from the inside to the outside as indicated by arrow 4', while in the case of heating the direction of flow will be from the outside to the inside, as indicated by arrow 4".

As a result, during a period of heating, heat is transferred in a direction opposite to the temperature gradient between the outer and the inner space, the transfer being produced by the movement of the heat carrying medium (air) from the outside to the inside, with the outcome that:

the heat, absorbed at the outer side (acted upon by the sun, or by radiation from the sky) will be transferred inwardly, the transmission of heat from the inner space into the shaded parts of the building or building structure will be transported back into the inner space by the oppositely moving heat carrying medium (air current), and water vapor cannot go (by diffusion) from the inner space into the cooler wall layers to be condensed.

In the summer months, or when the inner space is overheated for some time as for example on especially sunny winter days, the transport of heat is caused to take place outwardly by changing the direction of the air current through the air-permeable absorbing layer of the casing of the building, this being quite unlike prior art building casings, in which the air current goes from the outside to the inside.

FIGS. 3 to 6 show how heat is transported by the air current, into the parts of the building around the inner space.

Figure 3:
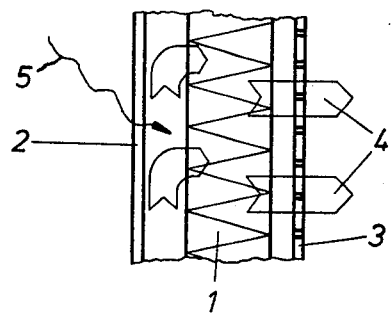
FIGS. 3 to 6 are views of the air currents under different radiation conditions.

FIG. 3 makes clear the transport of heat through a part of a building acted upon by the rays of the sun, and forming part of the building case or casing, whose outer cover is glass-clear or half-transparent. The heat freed in the absorbing layer 1 by energy conversion is transported by the air current into the inside of the building as long as this heat is necessary for getting to and keeping up the inner, preferred temperatures. On overheating being likely, the direction of air transport is reversed so that cool outer air goes into the inner space, air moving out through the absorbing layer stopping any further, now undesired, heat input. This simple automatic control keeps up, for as long as needed, the preferred thermal conditions within the building. Direct radiation from the sun (solar radiation) is indicated by arrow 5, arrows 4 marking the motion of the heat carrying medium, the condition in FIG. 3 indicating the motion of the carrying medium in winter on direct radiation from the sun.

In the case of diffuse radiation (arrowed 5') from the sky, the condition is as in FIG. 4, arrows 4 again marking the motion of the air current or flow. The structure or design of the building casing is made as is described above with reference to FIG. 2.

Figure 4:
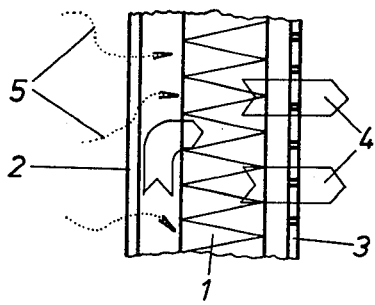

Under the conditions of FIG. 4, the increase in heat by radiation alone is very low, so that the fresh air guided inwards through the wall or ceiling is only preheated. The air going in through the absorbing sections heated by the oppositely moving transmission heat current, take up the heat (transported to this position by transmission) by a heat exchange process, transporting it back into the inner space. The current of heat to the inside of the building is, in this case, made up of two parts, namely an energy-part from the diffuse sky light and the transmission part from the inner space. The heat power requirement for the building in this case is only the difference between the ventilation heating requirement and the input from the diffuse radiation from the sky.

Figure 5:
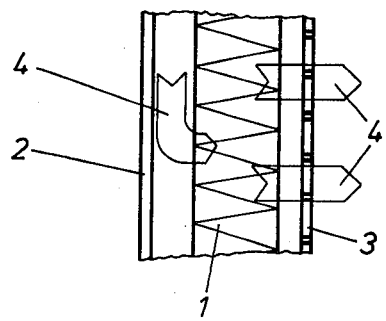

In FIG. 5 the conditions are as in FIGS. 3 and 4, but are for heat transport on cold winter nights. The full transfer of heat to the inner space (taking place with the air current) is produced by the transmission of heat from the absorbing layer 1, functioning in this case only as a heat exchanger.

Figure 6:
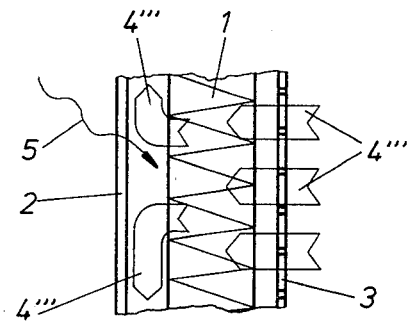

In the cases of FIGS. 3 to 5, an air current goes past the glass-clear or opaque casing 2 and through the absorbing layer 1 to the inner space of the building. In FIG. 6, on the other hand, is illustrated a summer transfer current in the presence of direct radiation from the sun, arrow represented by 5. In this case the air current (represented by arrow 4''') goes from the inner side, that is to say from the inner lining 3 when used, or from the inner face of the absorbing layer 1, outwards to the outer casing 2 and is moved therealong. So the conditions of FIG. 6 are in line with the case of the inside of the building casing of the invention when acted upon by the direct rays of the sun in summer. The radiant heat of the sun first held in the absorbing layer 1 is not, in accordance with the invention, made to go into the inner space because this would cause overheating. Rather, in this case, fresh air is caused to go as by way of a floor heat exchanger, into the inner space and is then caused to go outwards by way of the absorbing layer 1 of the outer wall and the roof face. (See FIG. 10). So the full heat from the absorbing layer goes out to the outside atmosphere around the building structure and undesired heating effects in the inner space (which would otherwise be produced by heat transmission) become zero.

The inside air (marked by arrow 4''' in FIG. 6) has its place taken, as noted before, by fresh air, which has been run through a floor heat exchanger and thereby cooled. This is not only responsible for stopping any increase in the transmission of heat to the inner space in the summer time, but also for cooling the inner space by stopping any heating up due to inside heat sources. Inside heat sources may, for example, be people, lights, radios, televisions, cookers, and other machines in the home.

The air collector, formed by the casing of the building may, in a way dependent on the desired property of the building structure, take the form of a wall, roof or floor structure without, or with, a cover shutting it off from the outer or inner space, which cover is suitable glass-clear or opaque in nature. As illustrated in FIG. 10, this air collector may, furthermore, have within it the heat distribution system necessary for heating input air. The motion of fresh air or waste air through the building casing is controlled by the suction or pressure effect of a mechanical air driving system (or fan, not illustrated), although it may be produced by natural current-producing effects such as the wind or as produced by a thermosiphon effect.

An important useful effect of the present building casing is that the energy need of the space within the casing is (a) in the case of heating operation decreased to the amount of heat necessary for heating up the air let into the building, this amount of heat being fully produced in the case of direct sunlight (or in part in the case of diffuse sunlight) by heat from outside the building and (b) during cooling operation, limited to the cooling power necessary for pre-cooling the air coming in, this power being taken from the floor heat exchanger.

The input of further energy to the inner space or the inner part of the building is limited to the power needed for driving the mechanical fan or the like and to partly covering the energy power need for heating up any additional air coming in from the outside. Thus with the building casing of the present invention, the shortcomings of prior art building casings or building systems is eliminated. These shortcomings are marked by losses of transmission heat, such losses having to be covered by the input of energy or by a decrease in energy using an air conditioning and heating system.

In a further development of the general design of the building casing as noted here and as designed as an integrated wide-area heat transmission system, it is possible, for making better use of the energy on hand, to make more use of of solar energy sun by storing the energy for a short time in the parts of the wide-area heat transmission system surrounding the building and/or to recover heat from the air leaving the building, which in the heating period goes from the building in a single current, the recovered heat being immediately usable for covering the ventilation heating requirements of the building directly at a very low temperature level.

An important increase in the efficiency of use of the solar energy acting on the building in the winter months may be produced, in the case of an integrated wide-area heat transmission system, by the use of a heat-storing part. In FIGS. 7a-7d, different forms of sections of a building casing for such an integrated wide-area heat transmission system are shown.

Figure 7A:
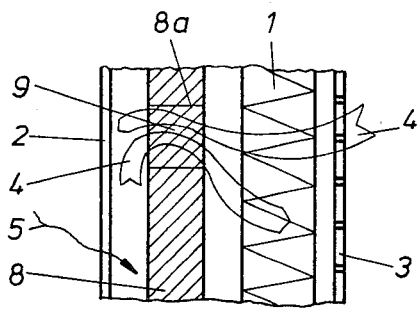
FIGS. 7a to 7d are views of different forms of the building casing, the casing having, in each case, its own heat-storing layer.
Figure 7C:
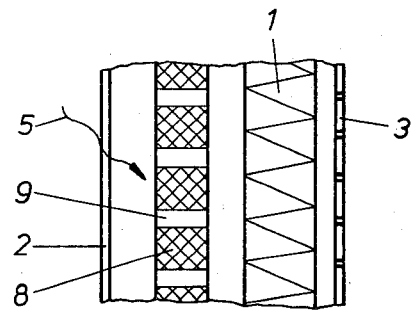
Figure 7B:
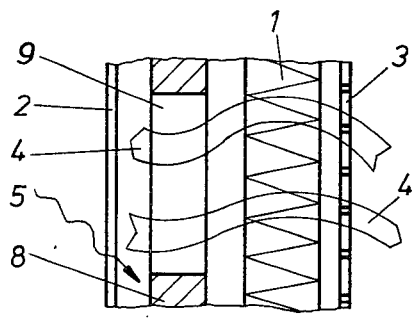
Figure 7D:
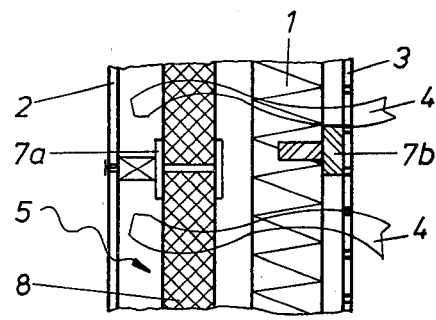

The building casing of FIGS. 7a to 7d is based on that shown in FIGS. 2 to 6 in which the casing, starting from the inside, is made up firstly of an absorbing layer 1 and a glass-clear or opaque outer case 2 spaced from the absorbing layer 1. By having an inbetween space, it is furthermore possible to have an air-permeable inner lining 3 forming the part nearest to the inside of the building. As noted at the start, the air-permeable inner lining may be present in addition to, or in place of, the outer casing 2. As made clear in FIGS. 7a to 7d, the viewed example of the building casing has a heat-storing layer between and spaced from the absorbing layer 1 and the outer casing 2. The heat-storing layer, herein named storing layer, may have the form of a monolithic or single-piece body 8 or be made up of a framework 8' having spaces filled with some other material. A storing layer 8 designed as a monolithic body is shown in FIGS. 7a and 7b, while a storing layer 8' of the other sort, a framework with spaces filled with some other material, is shown in FIGS. 7c and 7d.

The building cases to be seen in FIGS. 7a to 7d take the form of examples of the present invention with different transfer cross-sections. As noted earlier, in the structures of FIGS. 7a and 7b, a monolithic body 8 is used as the storing layer. A portion of the storing layer 8 is more permeable than the rest of the layer, while in the example of FIG. 7b we have a passage 9 for an air current which is heavier than permitted through the section 8a shown in FIG. 7a. Thus, in the example of FIG. 7a, slower discharge is possible, while in the example of FIG. 7b, because of the greater possible rate of the current, there is a quicker discharge of the storing layer 8. In the examples shown in FIGS. 7c and 7d, the storing layer is formed by the openwork of a frame structure. In the example of FIG. 7c, quite like that of FIG. 7b, there may be passages 9 or ducts 9' in the storing layer 8; while, in another form of the invention (FIG. 7d), no such ducts or transport ways are present.

Thus, in the embodiment shown in FIG. 7c there is a quicker discharge of the storing layer 8' than in the example of FIG. 7d. The examples of the invention of FIGS. 7a to 7d will make clear different possible ways of designing the cross-sections of the ducts or passages and thereby make clear the base-teaching of the invention as to how the discharge speed of the storing layer may be controlled as desired beforehand. For this reason, using the building casing as presented in FIGS. 7a to 7d, it is possible for the input of solar energy coming to the building at various times to be stored and used at other times. It is important in this respect to have the storing layer 8 or 8' between the outer casing 2 and the absorbing layer 1 and part of or integrated with the absorbing layer 1.

In the example of the invention presented in FIG. 7d, the storing layer 8' is in the form of an openwork on a framework structure, part numbers 7a and 7b marking the parts of the support structure supporting the storing layer 8' and the absorbing layer 1 in a certain desired position in the building casing and/or spaced from each other and from the outer casing 2. The part 7a has within it the storing layer 8' and keeps it in position in relation to the outer casing 2, while the part 7b is placed between the inner line 3 and the absorbing layer 1. Arrows representing the air current moving through the highly air-permeable parts 8a or through the passages 9 are marked 4 in FIGS. 7a to 7d.

It will be seen from the account given that the building casing of the present invention may be designed with different air current cross-sections, this being responsible for different discharge times of the absorbing and storing layer 8 or 8'.

FIG. 8a is a view of a building casing, in which the storing layer 8' is placed in front of the absorbing layer 1, keeping a space between the storing layer 8 and the absorbing layer 1. In FIG. 8b, the storing layer 8' is shown as a part of, or integrated with, the absorbing layer 1, there then being no space between the storing layer 8' and the absorbing layer 1. In this latter embodiment the storing layer 8' is spaced from the outer casing 2.

The heat-storing layer 8 or 8' may take the form of a sensible or latent storing system. As a sensible storing system it is possible to make use of prior art, solid wall or ceiling parts with their faces in line, such as those made of concrete, brickwork or the like. As a latent storing system, use may be made of inorganic or organic substances, whose phase transition temperature is between $+15°$ C. and $+40°$ C., as for example alkali metal or alkaline earth metal fluorides with a high amount of water of crystallization, paraffins etc. These storing layers may, along with their storing function in the present invention's building casing, have further functions, namely: a static function (as a supporting wall), a fire-proofing function (for keeping back the effect of a fire or designed so as not to be able to be burned), and an acoustic function (for sound-insulating).

The input of the heat necessary for meeting the ventilation heat requirement on sunless days may be produced, in the case of the building casing of the present invention, by using a wide-area heating system, as for example a floor heating system or a wall heating system. In the last-named case a pipe system, located for the heating of the area, is simply joined with the inner structure lining, for example with the air-permeable inner lining 3. In the schematic of FIGS. 9a and 9b, a building casing with an integrated wall heating system is shown.

FIG. 9a shows a building casing without a storing layer and FIG. 9b shows a building casing with a storing layer 8. FIG. 9a is generally in line with the examples of FIGS. 2 to 6, while FIG. 9b corresponds to the examples of the invention of FIGS. 7a through 7d. The pipes of the wide-area heating system are marked 6 in FIGS. 9a and 9b and the directions of the air currents are shown in these figures by arrow 4a for heating and by arrow 4b for cooling. It will be clear from FIGS. 9a and 9b that the air flow direction on heating is from the outside to the inside, and on cooling the current direction is from the inside to the outside.

The building casing of the invention, designed as an integrated wide-area heat transmission system, makes it possible, under heating conditions, the collection of the waste air from a room, a group of rooms or from the complete building and transfer of the heat by way of a common waste air-way. This makes possible a simple placing of the heat recovery plant, with the help of a heat pump, in the waste air current. The recovery of that heat or at least a great part of it, needed to meet the ventilation heat requirements of the building, is then, in this case, readily possible. The building casing of the invention, in the form of an integrated wide-area heat transmission system may, for these reasons, be used in connection with a heat pump waste air recovery system to take the form of a generally closed-circuit thermal heating system in the building in question. A schematic of this closed thermal heating circuit is to be seen in FIG. 10, it being made up of the parts now named: A building casing 14, which may be designed using the teachings given in the present specification, is placed around the inner space of a building. Within the building there is a heat exchanger 15 in connection with a heat pump, the heat exchanger 15 being placed near a waste air chimney 16. The waste air chimney 16 may furthermore be united with a waste air fan or ventilator or the waste air chimney may be made high enough to assure the desired air current. The floor of the building, within the building casing 14, is in the form of a heating floor structure 13, under which there is a floor heat exchanger 12. There is a ventilation shaft or pipe 11 used for the input and escape of air from the inside of the building casing. As a further possible design, in place of the ventilation pipe 11, it is possible to have an air shaft or pipe 17 which, using the natural air motion during the cooling operation, makes possible a wind current and, for this reason, natural ventilation.

In FIG. 10 the air circulation inside the building casing 14 for the cooling operation is marked by broken lines, the full, unbroken arrows marking air circulation during heating operation.

The teaching shown in FIG. 10 is only to be taken as an example for an integrated wide-area heat transmission system, making use of the building casing of the present invention.

The air-conditioning in the inner space of the building, shown in FIG. 10, may be undertaken in such a way that the air is forced through the absorbing layer, the speed of the air on going through the layer being so controlled that the heat, taken up by the absorbing layer by the transfer of heat and conduction of heat, is given up to the air moving through. In this respect the fresh air may be drawn into the inner part of the building through the building casing. As a further possible design, the fresh air may be drawn in through the floor heat exchanger 12 and, after cooling, be sent into the inside of the building casing. The waste air is run off to the outside through the building casing 14. With the use of blowers, fans or the like, in connection with the building casing of the present invention, it is possible to make certain that the air inside the building is kept at a pressure level which is higher or lower than the atmospheric pressure.

The glass clear outer casing used in the building casing of the present invention is made up, for example of silicate glass or glass-clear plastics parts or foils of a compound structure of such parts. As opaque outer casings it is possible to make use, for example, of concrete, tiles, bricks, sheet metal, plastics, that is to say normal building materials. In the embodiment of FIG. 8, the outer layer may take the form of an opaque outer layer such as a sheet of copper.

The layer 1, having the function of heat-absorbing and heat-exchanging, is, for example made up of mineralized fiber materials, open-pored mineralized parts, insulating material, mineralized fiber wood building materials or loose fillings (gravel fillings with a certain grain size).

What is claimed is:

1. A system for air conditioning a building in either a cooling mode or in a heating mode, comprising:
   means, including a layer of heat absorbing and heat exchanging material, permeable to air flow, forming a wall of said building, and
   an outer casing arranged along said wall spaced from said layer for creating air flow through said layer controlled such that it is directed (a) during cooling mode operation from inside said building into the space between the wall and the outer casing, and (b) during heating mode operation from said space into the inside of said building,
   a permeable inner lining arranged on the opposite side of the layer of heat absorbing and exchanging material from said outer casing and spaced from said heat absorbing and exchanging layer, and
   a heat storing layer located between said heat absorbing and heat exchanging layer and said outer casing.

2. A system according to claim 1, wherein said outer casing is opaque.

3. A system according to claim 1, wherein said outer casing is transparent.

4. A system according to claim 1, 2 or 3, wherein said inner lining is spaced from said heat absorbing and heat exchanging layer.

5. A system according to claim 1, 2 or 3, wherein said heat storing layer is formed by a sensible storing substance.

6. A system according to claim 1, 2 or 3, wherein said heat storing layer is formed by a latent storing substance.

7. A system according to claim 1, 2 or 3, wherein said heat storing layer is formed of concrete, tile of alkali metal, or alkaline earth metal fluorides with a high amount of water crystallization or paraffins.

8. A system according to claim 1, 2 or 3, wherein said heat absorbing and heat exchanging layer comprises a mineralized fiber material.

9. A system according to claim 1, 2 or 3, wherein said heat absorbing and heat exchanging layer comprises open-pored mineralized parts.

10. A system according to claim 1, 2 or 3, wherein said heat exchanging and heat absorbing layer comprises an insulated material.

11. A system according to claim 1, 2 or 3, wherein said heat storing layer comprises portions for conducting an airstream.

12. A system according to claim 4, wherein said heat storing layer is formed by a sensible storing substance.

13. A system according to claim 4, wherein said heat storing layer is formed by a latent storing substance.

14. A system according to claim 4, wherein said heat storing layer is formed of concrete, tile of alkali metal, or alkaline earth metal fluorides with a high amount of water crystallization or paraffins.

15. A system according to claim 4 wherein said heat absorbing and heat exchanging layer comprises a mineralized fiber material.

16. A system according to claim 5 wherein said heat absorbing and heat exchanging layer comprises a mineralized fiber material.

17. A system according to claim 6 wherein said heat absorbing and heat exchanging layer comprises a mineralized fiber material.

18. A system according to claim 1 wherein said heat absorbing and heat exchanging layer comprises a mineralized fiber material.

19. A system according to claim 4, wherein said heat absorbing and heat exchanging layer comprises open-pored mineralized parts.

20. A system according to claim 5, wherein said heat absorbing and heat exchanging layer comprises open-pored mineralized parts.

21. A system according to claim 6, wherein said heat absorbing and heat exchanging layer comprises open-pored mineralized parts.

22. A system according to claim 7, wherein said heat absorbing and heat exchanging layer comprises open-pored mineralized parts.

23. A system according to claim 4, wherein said heat exchanging and heat absorbing layer comprises an insulated material.

24. A system according to claim 5, wherein said heat exchanging and heat absorbing layer comprises an insulated material.

25. A system according to claim 6, wherein said heat exchanging and heat absorbing layer comprises an insulated material.

26. A system according to claim 7, wherein said heat exchanging and heat absorbing layer comprises an insulated material.

27. A system according to claim 4, wherein said heat storing layer comprises portions for conducting an airstream.

28. A system according to claim 5, wherein said heat storing layer comprises portions for conducting an airstream.

29. A system according to claim 6, wherein said heat storing layer comprises portions for conducting an airstream.

30. A system according to claim 7, wherein said heat storing layer comprises portions for conducting an airstream.

31. A system according to claim 8, wherein said heat storing layer comprises portions for conducting an airstream.

32. A system according to claim 9, wherein said heat storing layer comprises portions for conducting an airstream.

33. A system according to claim 10, wherein said heat storing layer comprises portions for conducting an airstream.

* * * * *